United States Patent [19]

Harada et al.

[11] Patent Number: 4,790,649
[45] Date of Patent: Dec. 13, 1988

[54] AUTOMATIC FOCUSING APPARATUS

[75] Inventors: Yoshihito Harada, Kawasaki; Akira Ishizaki, Yokohama, both of Japan

[73] Assignee: Canon Kabushiki Kaisha, Tokyo, Japan

[21] Appl. No.: 688,355

[22] Filed: Jan. 2, 1985

[30] Foreign Application Priority Data

Jan. 12, 1984 [JP] Japan ................................. 59-3998
Jan. 19, 1984 [JP] Japan ................................. 59-8342

[51] Int. Cl.⁴ ............................................. G03B 3/00
[52] U.S. Cl. .................................. 354/400; 354/402; 354/408; 354/286
[58] Field of Search ............... 354/400, 401, 402, 403, 354/404, 405, 406, 407, 408, 286, 195.1, 195.12

[56] References Cited

U.S. PATENT DOCUMENTS

| | | | |
|---|---|---|---|
| 4,437,752 | 3/1984 | Akashi et al. | 354/286 |
| 4,477,164 | 10/1984 | Nakai et al. | 354/286 |
| 4,509,842 | 4/1985 | Taniguchi et al. | 354/286 |
| 4,529,288 | 7/1985 | Nakai et al. | 354/286 |
| 4,557,579 | 12/1985 | Nakajima | 354/286 |

*Primary Examiner*—Russell E. Adams
*Attorney, Agent, or Firm*—Fitzpatrick, Cella, Harper & Scinto

[57] ABSTRACT

The invention relates to an automatic focusing apparatus, particularly, of a type wherein a lens drive amount is calculated by circuits in a camera in accordance with an output from a focusing detection circuit, the calculation result is transmitted to a lens mounted on the camera, and the lens is driven accordingly. While the lens unit is driven for a distance corresponding to the calculation result, operation of the focusing detection circuit of the camera is prohibited by sending a signal for prohibiting the operation of the focusing detection circuit thereto through a contact for transferring data from the camera to the lens unit in modes other than the lens drive mode. The number of contacts between the camera and the lens unit is reduced.

40 Claims, 1 Drawing Sheet

AUTOMATIC FOCUSING APPARATUS

BACKGROUND OF THE INVENTION

1. Field of the Invention

The present invention relates to an automatic focusing apparatus comprising a camera having a distance measuring function through a TTL optical system, and a lens with a lens driving circuit for driving the lens in accordance with lens drive amount data supplied from the camera.

2. Description of the Prior Art

In a system of the type described above, the distance measurement data obtained during the lens drive operation does not accurately represent an actual distance. Therefore, the distance measuring operation must be prohibited during the lens drive operation. For this purpose, connecting terminals or contacts between the camera and the lens in this system must include a data line for transferring the lens drive amount data to the lens side, and another line for transferring to the camera a signal which represents that the lens is being driven and which is used to disable the distance measuring operation during the lens drive operation.

When the lens drive amount data is transferred in the form of a digital signal a data line having a large number of bits is required. For this reason, serial data transfer is adopted. However, in this case, sync clocks for serial data transfer must be supplied from the camera to the lens in addition to the lens drive amount data. This means that a minimum of three lines must be included, resulting in an increase in the number of contacts between the lens and the camera.

Various types of lenses can be used, including a lens having a distance measuring function, an AF lens or a normal lens in addition to the lens of the type described above. The camera must allow the mounting of any lens.

The AF lens performs automatic focusing. When this lens is mounted on the camera, the camera need not perform an operation to calculate a lens drive amount.

With a normal lens, even if a signal representing the lens drive amount is supplied from the camera, the lens cannot be driven. Then, the operation as described above need not be performed.

SUMMARY OF THE INVENTION

It is an object of the present invention to transfer to a camera a signal representing that a lens is being driven through a line for transmitting sync clocks, so that a single signal line can serve to transmit multiple signals, and the number of terminals between the camera and the lens can be reduced.

In order to achieve the above object of the present invention, in an automatic focusing apparatus wherein a lens drive amount is calculated by a distance measuring operation, a signal representing the calculated lens drive amount is supplied to a lens so as to drive the lens, and a lens drive status-signal (signal representing that the lens is being driven) is supplied to the camera so as to prohibit the distance measuring operation during the lens drive operation, wherein there are provided at the camera side an operation circuit for operating or calculating a digital signal representing the lens drive amount based on a distance measuring circuit output, a data terminal for serially transmitting the digital signal from said operation circuit, and a clock terminal for transmitting clock pulses for performing serial transfer of the digital signal; and there is provided at the lens side a signal formation circuit which enables the lens drive status signal to be supplied to said clock terminal after it has detected that the digital signal supplied through said data terminal has been transmitted, and which disables the lens drive status signal upon detecting that the lens drive operation based on the digital signal has been completed.

It is another object of the present invention to switch an operation/display mode of a camera in accordance with a type of lens mounted thereon and to set the camera in a mode most suitable for the type of lens mounted.

It is still another object of the present invention to use a data terminal for transferring other data (data other than that representing the lens type) and for transmitting data representing the type of lens mounted, so that the total number of data terminals required is reduced.

The above and other objects, features and advantages of the present invention will become apparent from the following detailed description taken in conjunction with the accompanying drawings.

DETAILED DESCRIPTION OF THE PREFERRED EMBODIMENT

An automatic focusing apparatus according to the present invention will now be described with reference to the accompanying drawings.

Figure 1A:
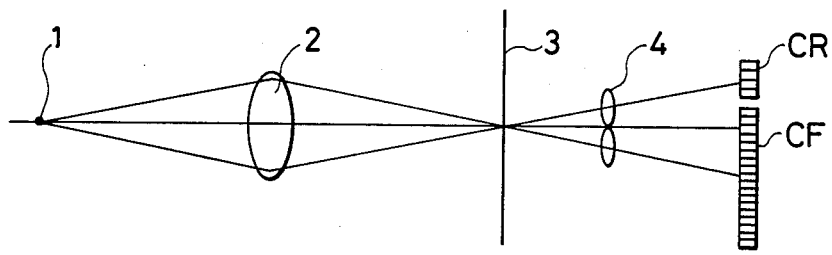
FIG. 1A is a schematic view for explaining the distance measuring principle which is adopted in an automatic focusing apparatus of the present invention.

FIG. 1 is a schematic diagram showing an example of a distance measuring system which is adopted in a camera using a transmission apparatus according to the present invention.

Referring to FIG. 1, an image of an object 1 to be photographed is formed on a film surface 3 through a photographic lens 2. A secondary image is formed on two line sensors CR and CF comprising CCDs through a secondary optical system 4.

Figure 1B:
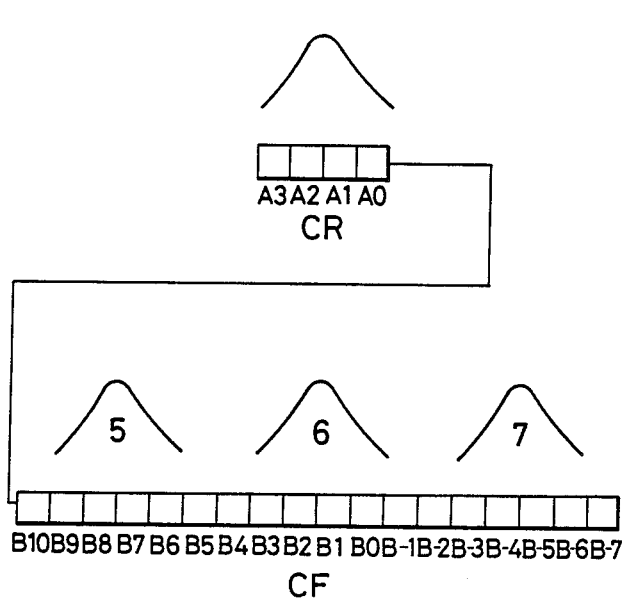
FIGS. 1B and 1C are views for explaining the principle shown in FIG. 1A.
Figure 1C:
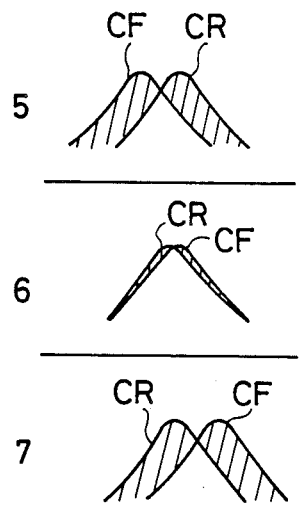

The sensor CR is a reference sensor section which consists of four sensing portions $A_0$ to $A_3$ as shown in FIG. B. The sensor CF comprises a sensor section consisting of 18 sensing portions $B_0$ to $B_{10}$ and $B_{-1}$ to $B_{-7}$. The image of the object if formed at a predetermined position on the sensor CF having this arrangement. In the case of the near-focus state, the image is formed at the side of the sensing portions $B_2$ to $B_{10}$ as indicated by 5 (FIGS. 1B and 1C). On the other hand, in the far-focus state, the image is formed at the side of the sensing portions $B_{-1}$ to $B_{-7}$ as indicated by 7 in FIGS. 1B and 1C. In the in-focus state, the image is formed on the sensing portions $B_0$ to $B_3$ as indicated by 6 in FIGS. 1B and 1C. When the image position on the sensor CF is detected, the focusing state (near- or far-focus state or lens driving direction) and the deviation (distance) from the in-focus position can be detected The distance detection system described above is known. However, the present invention is not limited to a distance detection operation per se and the distance detection operation can be performed by any suitable method available in the present invention. For this reason, an explanation of the distance detection system is confined to the above.

Figure 2:
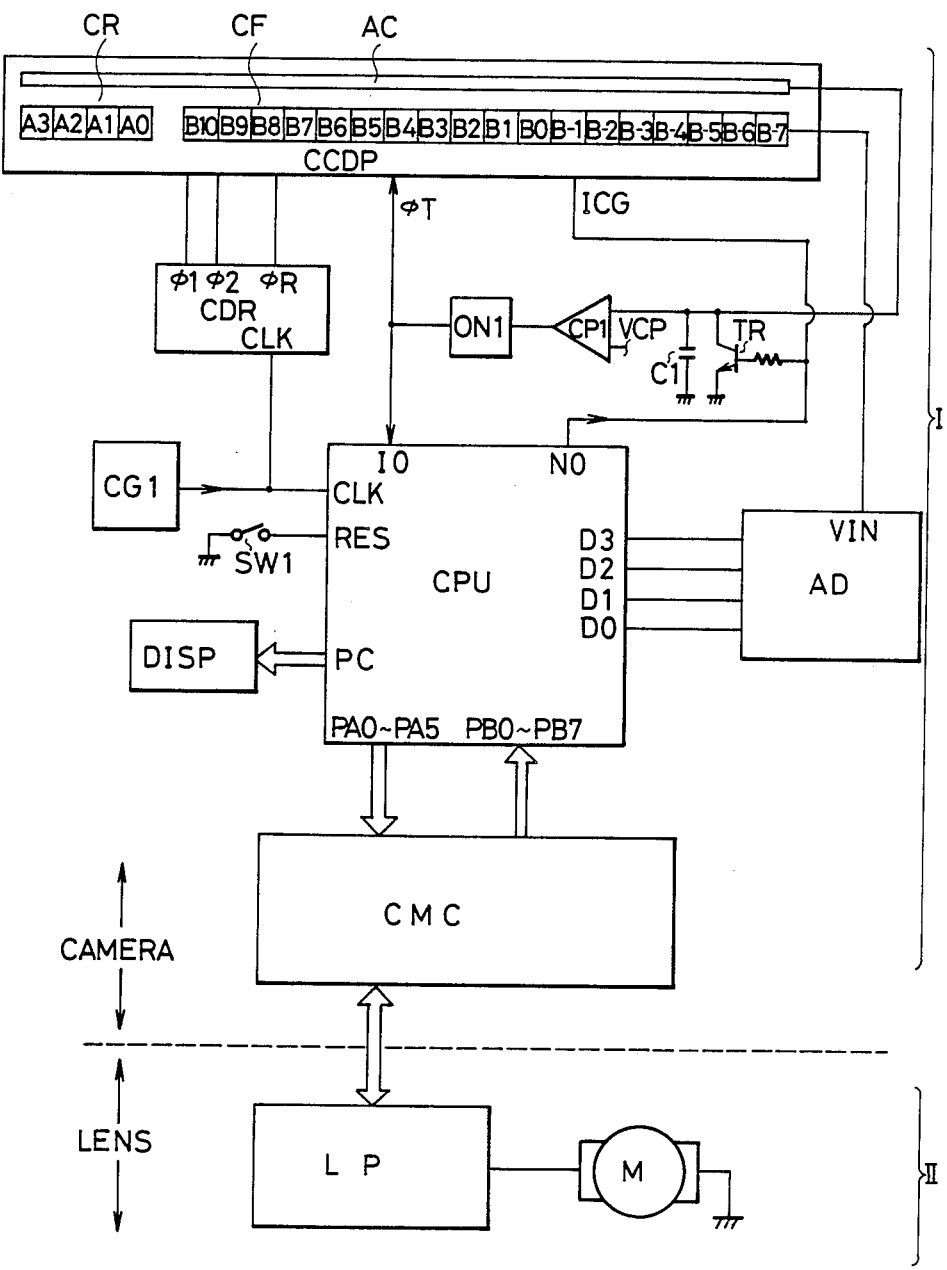
FIG. 2 is a block diagram showing an automatic focusing apparatus according to an embodiment of the present invention.

FIG. 2 is a block diagram of an embodiment of a camera and a lens in which a transmission apparatus according to the present invention is adopted.

The overall apparatus consists of a camera side I and a lens side II. A photosensor section CCDP at the camera side I has the sensors CR and CF described above and an average sensor AC for detecting the average amount of the light which is incident on the sensors CR and CF. The photosensor section CCDP is driven in a known manner by a clock driver CDR which generates two-phase clocks $\phi 1$ and $\phi 2$ and set clocks $\phi R$ with reference to clocks from a clock generator CG1. A capacitor C1 is charged by an output from the sensor AC. A comparator CP1 compares the charge on the capacitor Cl with a reference voltage VCP and generates a comparison output (high level; to be referred to as H level hereinafter) when the output from the capacitor C1 exceeds the voltage VCP. A one-shot multivibrator ON1 produces transfer pulses $\phi T$ in response to the comparison output from the comparator CP1. When the pulse $\phi T$ is supplied to the photosensor CCDP, photocharges accumulated on the sensing portions of the sensors CR and CF are transferred to analog shift registers of the sensors and are accumulated. The photocharges stored on the analog shift registers are time-serially output in response to the pulses $\phi 1$ and $\phi 2$.

An A/D converter AD receives and converts the time-serial output from the photosensor CCDP into 4-bit digital signals.

A central processing unit CPU performs operation processing (to be described later) and sequence control of various other operations of the overall apparatus. A reset terminal RES of the CPU is connected to a switch SW1 which is turned on upon the first stroke of a shutter release button. A signal of H level is normally supplied to the reset terminal RES, so that the program counter of the CPU is set to zero and the start step (to be described later) is designated. When a signal of low level (to be referred to as L level hereinafter) is supplied to the reset terminal RES, the program to be described later is executed from the start block.

The CPU also has a terminal NO. When a signal at the terminal NO is enabled (H level), the integration clear gates of the sensors are opened to clear the accumulated charges thereon, a transistor TR is turned on, and the capacitor C1 is reset. When the signal at the terminal NO is disabled (L level), the transistor TR is turned off to start charging the capacitor C1 and to start the accumulation operation of the photocharges by the sensors.

Input terminals D0 to D3 are connected to output terminals of the A/D converter AD and receive therefrom digital signals corresponding to the accumulated charges on the sensors. Output ports PA0 to PA5 of the CPU produce operation (calculation) values obtained in a manner to be described later. Input ports PB0 to PB7 of the CPU receive various input data. A terminal PC is used to produce focusing state data such as a lens drive direction or the like.

A signal transmission circuit CMC is connected to the input and output ports PA0 to PA5 and PB0 to PB7 of the CPU and a lens drive circuit LP at the lens side.

The lens drive circuit LP at the lens side II drives a motor M in accordance with a distance signal and a direction signal. A distance ring of the lens is driven in synchronism with the motor M, and automatic focusing is performed in accordance with the distance signal.

Figure 3:
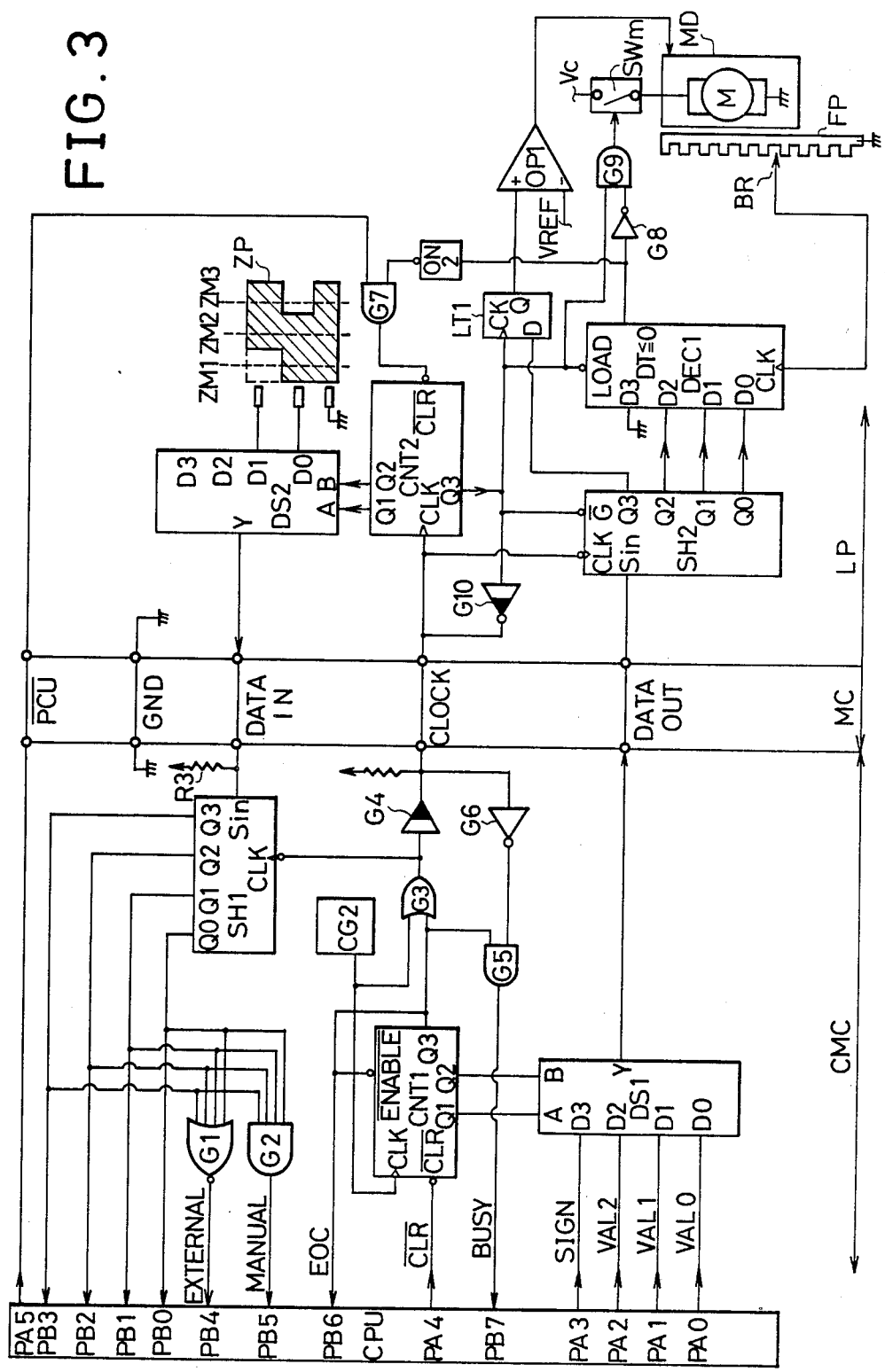
FIG. 3 is a circuit diagram showing the main part in the apparatus shown in FIG. 2.

FIG. 3 is a circuit diagram showing an embodiment of the signal transmission circuit CMC and the lens drive circuit LP.

In the signal transmission circuit CMC shown in FIG. 3, a binary counter CNT1 counts the leading edges or positive-going edges of the clock signal from a clock generator CG2. An output terminal Q3 of the binary counter CNT1 is connected to one input terminal of an OR gate G3 and to an enable terminal $\overline{\text{ENABLE}}$ of the binary counter CNT1. The other input terminal of the OR gate G3 is connected to the clock generator CG2. The OR gate G3 keeps generating clock pulses of the clock generator CG2 until a signal of H level is received, and thereafter generates signals of H level. The pulses from the OR gate G3 are supplied to the lens drive circuit LP through an open-collector buffer G4 and a connecting terminal connecting the lens and camera.

Control terminals A and B of a data selector DS1 are connected to output terminals Q1 and Q2 of the binary counter CNT1. When both the control terminals A and B are at L level, the data selector DS1 produces a signal received at an input terminal D0 from an output terminal Y. When the control terminal A is at H level and the control terminal B is at L level, the data selector DS1 produces data received at an input terminal D1 from the output terminal Y. When the control terminal A is at L level and the control terminal B is at H level, the data selector DS1 produces data received at an input terminal D2 from the output terminal Y. When both the control terminals A and B are at H level, the data selector DS1 produces data received at an input terminal D3 from the output terminal Y. As described above, the counter CNT1 is a binary counter. Therefore, the data from the output ports PA0 to PA3 of the CPU are transmitted in synchronism with the clocks in the order of the ports PA0 to PA3. The output ports PA0 to PA2 produce signals representing the amount of lens drive required to attain the in-focus position. The output port PA3 produces a signal representing a drive direction.

Input terminals of an AND gate G5 are connected to the output Q3 of the counter CNT1 and the buffer G4 through an inverter G6. An output from the AND gate G5 is connected to an input port PB7 of the CPU. The gate G5 supplies a lens drive status signal (to be referred to as a BUSY signal hereinafter) to the input port PB7.

A shift register SH1 receives and shifts serial data (zoom ratio data and lens type data) received from a terminal DATAIN in synchronism with the positive-going edge of the pulse from the OR gate G3. Outputs Q0 to Q3 of the register SH1 are connected to the input ports PB0 to PB3 of the CPU for receiving the zoom ratio data.

Input terminals of an AND gate G2 are connected to the output terminals Q0 to Q3 of the register SH1. The AND gate G2 detects if the lens mounted on the camera is a normal manual lens.

Input terminals of a NOR gate G1 are also connected to the output terminals Q0 to Q3 of the register SH1. The NOR gate G1 detects if the lens mounted on the camera is a lens which includes a distance measuring circuit and if it has automatic focusing.

A binary counter CNT2 of the lens drive circuit LP counts the positive-going edges of the clocks supplied through the buffer G4. Output terminals Q1 and Q2 of the counter CNT2 are connected to input terminals A and B of a data selector DS2. As in the case of the data selector DS1, the data selector DS2 produces signals supplied to the input terminals D0 to D3 from an output terminal Y in synchronism with its counting operation and in the order of the terminals D0 to D3.

A zoom plate ZP comprises a conductor which is displaced in accordance with a change in a preset zoom ratio and which contacts with the input terminals D0 and D1 of the data selector DS2 at predetermined positions ZM1 to ZM3. The zoom ratio data is supplied in accordance with data from the zoom plate, and the lens drive amount is compensated in accordance with the zoom ratio data.

An output terminal Q3 of the counter CNT2 is connected to an inverting open-collector gate G10. The output terminal of the gate G10 is connected to a clock input terminal CLK of the counter CNT2.

A shift register SH2 is connected to the output terminal Y of the data selector DS1 through a data output line DATAOUT. A clock terminal CLK of the shift register SH2 is connected to the buffer G4 through a line CLOCK. The shift register SH2 shifts the input data in synchronism with the positive-going edges of the clocks supplied through the buffer G4. A terminal $\overline{G}$ of the shift register SH2 is a control terminal for prohibiting the shift operation upon reception of a signal of H level.

A latch circuit LT1 comprising a D flip-flop latches a drive direction signal. A clock terminal CK of the latch circuit LT1 is connected to the output terminal Q3 of the counter CNT2. When a signal of H level is received from the terminal Q3 of the counter CNT2, the latch circuit LT1 latches an output signal from the output terminal Q3 of the shift register SH2. An operational amplifier OP1 amplifies an output from the latch circuit LT1. An amplified signal from the operational amplifier OP1 is supplied to a forward/reverse control circuit MD and drives the motor M in the forward or reverse direction in accordance with the direction signal latched in the latch circuit LT1.

Input terminals D0 to D2 of a down counter DEC1 are connected to output terminals Q0 to Q2 of the shift register SH2. The down counter DEC1 loads an input signal in response to a positive-going edge of the clocks supplied to a terminal LOAD and counts down in accordance with input clocks supplied to a clock terminal CLK. When the count of the counter DEC1 becomes zero, a signal of H level is produced from a terminal DT≦0. The terminal DT≦0 is connected through an inverter G8 to one input terminal of an AND gate G9 having the other input terminal connected to the output terminal Q3 of the counter CNT2. When the output from the gate G9 is H level, a switch SWm is turned on. A slider BR is slid on a contact plate FP in synchronism with the motor M. A number of pulses corresponding to the drive amount of the motor are generated by the ON/OFF operation of the plate FP and the slider BR.

Figure 4A:
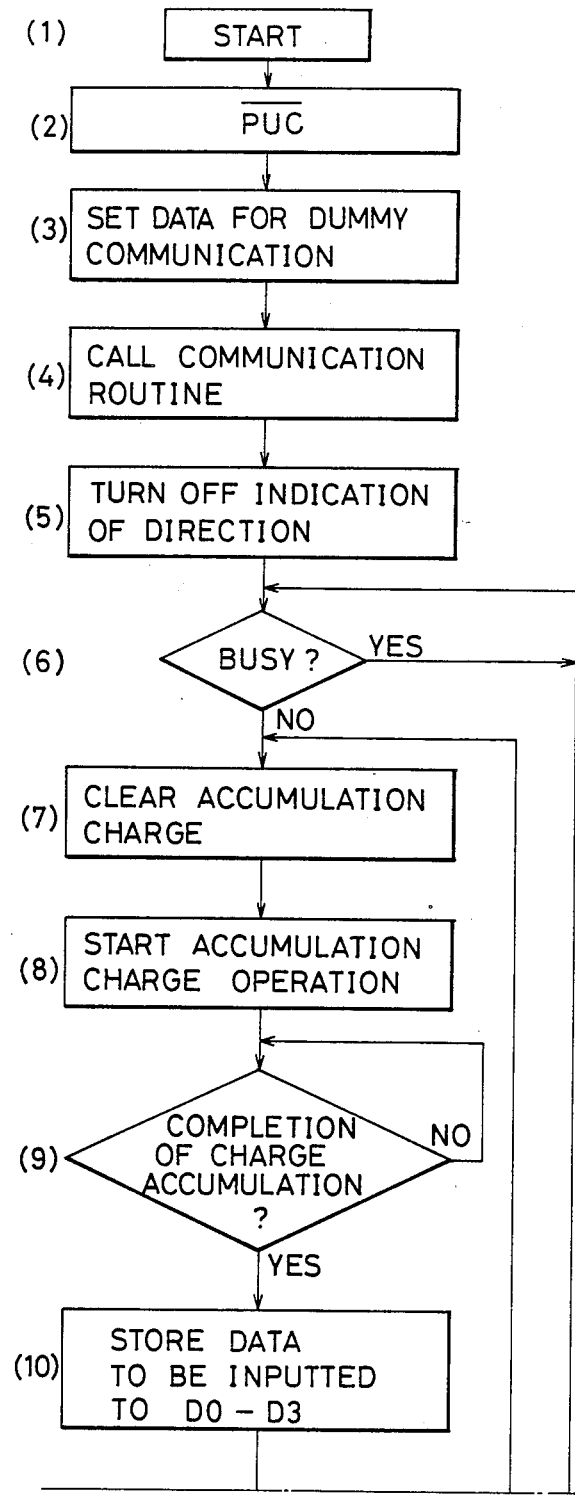
FIGS. 4(a) and 4(b) are flow charts for explaining the operation of the circuit shown in FIG. 3.
Figure 4B:
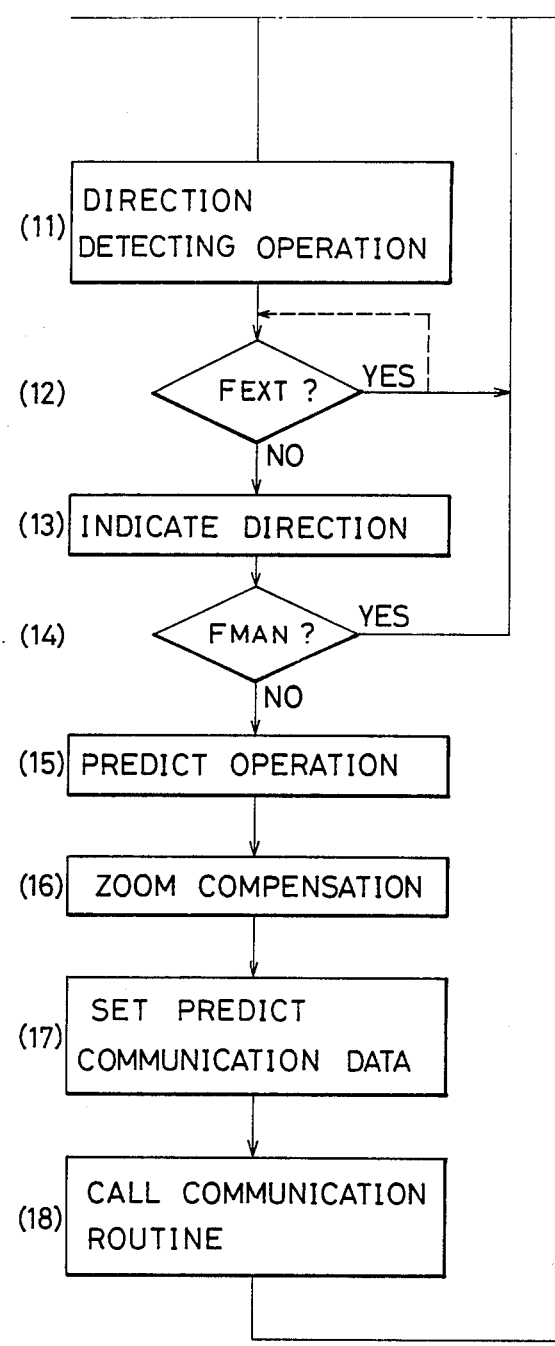

Automatic focusing in the camera and lens system of the present invention will be described with reference to the flow chart shown in FIGS. 4(a) and 4(b) and the waveform chart shown in FIG. 5.

Assume that power is supplied to the camera and the lens, and the shutter release button is depressed by one stroke. The CPU starts executing the program from START. Note that when the input signal at the terminal RES is at H level, the program counter is reset to zero and the program step is held at the START step.

When the first stroke is performed as described above, a switch SW1 is turned on. Since the input at the terminal RES of the CPU goes to L level, holding of the program flow at the START step is released, and the flow advances to the next step $\overline{PUC}$. In the step $\overline{PUC}$, a negative pulse is supplied from the output port PA5 to the lens drive circuit LP through a terminal PUC at a contact of a mount, thereby initializing the lens drive circuit LP. Then, the counter CNT2 is initially set. Thereafter, the CPU advances to the next dummy communication data set step. In this step, the CPU produces L level signals from all the output ports PA0 to PA3. Data SIGN produced from the port PA3 represents the drive direction of the lens. DATA VAL0 to VAL2 from the ports PA0 to PA2 represent the drive amount. When these data are set, the flow advances to the communication routine call step. In this step, a communication routine (to be described later) is read out, and the data at the lens side is read without driving the lens in accordance with the dummy communication data. In the communication routine, the output port PA4 of the CPU produces a clear pulse CLR (FIG. 5) to reset the counter CNT1. Then, the input to the terminal $\overline{ENABLE}$ of the counter CNT1 goes to L level. Therefore, the counter CNT1 counts pulses from the clock pulse generator CG2 and changes the levels at the output terminals Q1 to Q3 as shown in FIG. 5. The output terminals Q1 and Q2 of the counter CNT1 are connected to the input terminals A and B of the data selector DS1. The data selector DS1 time-serially produces the data received from the output ports PA0 to PA3 of the CPU from the output terminal Y in accordance with a change (binary change) in the output terminals Q1 and Q2 of the counter CNT1.

Clock pulses from the clock pulse generator CG2 are supplied to the shift register SH1 through the gate G3 and to the counter CN2 and the shift register SH2 through the open-collector buffer G4 and the mount contact.

The data time-serially produced from the output ports PA0 to PA3 of the CPU are transferred to the shift register SH2 through the data selector DS1. When the counter CNT2 counts, the data selector DS2 time-serially produces the data received at the input terminals D0 to D3 from the output terminal Y. The data produced by the data selector DS2 is transferred to the shift register SH1 through the line DATAIN, thus completing transfer of the data applied to the input terminals of the data selector DS1 to the shift register SH1.

During the data transfer as described above, when a signal of H level is produced from the output terminal Q3 of the counter CNT1, this signal is supplied to the terminal $\overline{ENABLE}$ of the counter CNT1. Therefore, the counter CNT1 stops the counting operation when the above-mentioned data transfer is completed (time J4 in FIG. 5). An output signal EOC from the output terminal Q3 of the counter CNT1 is supplied to the input port PB6 of the CPU, and the CPU fetches the input data received at the input terminals PB0 to PB5.

Figure 5:
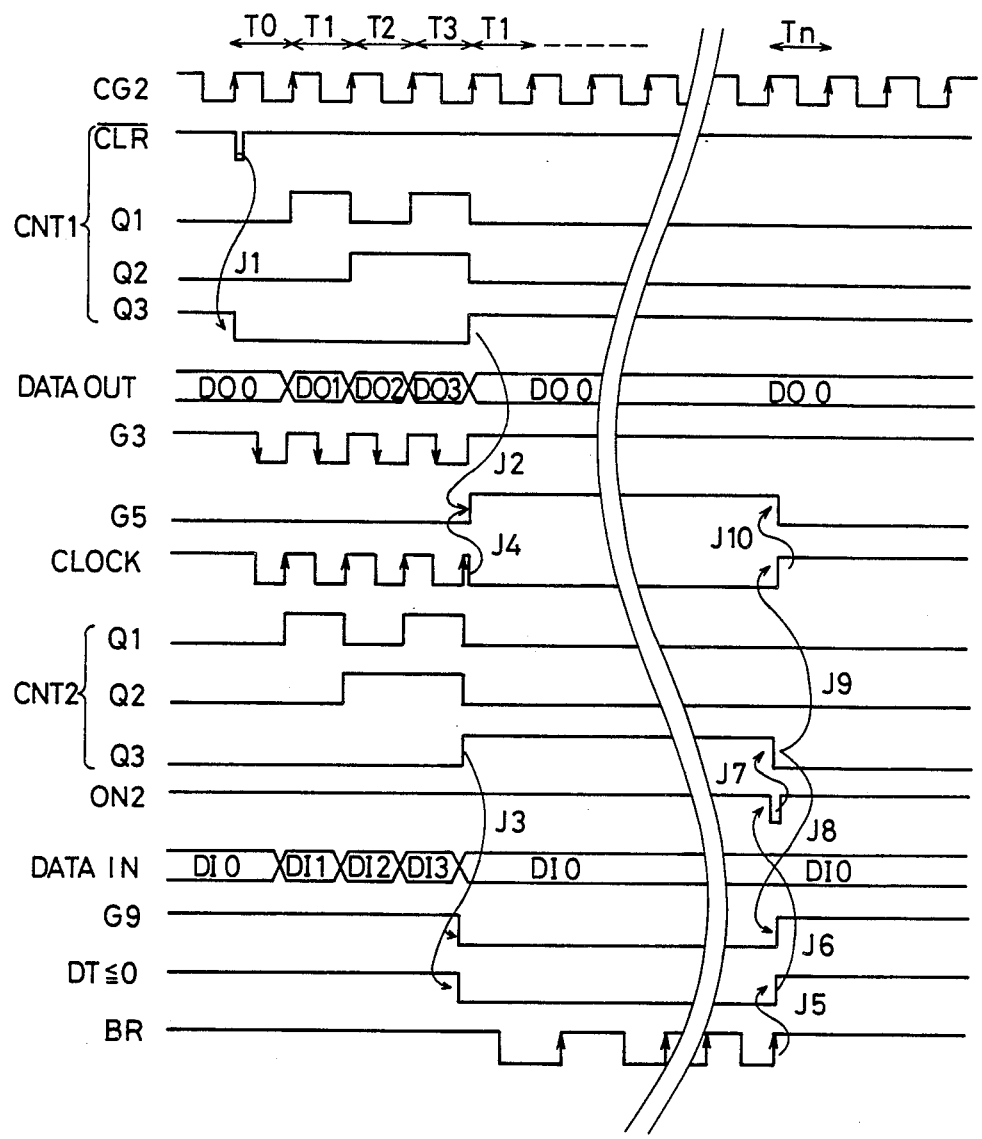
FIG. 5 is a waveform chart for explaining the operation of the circuit shown in FIG. 3.

When data transfer is completed in this manner, the output from the output terminal Q3 of the counter CNT2 is at H level as shown in FIG. 5. Therefore, the output from the inverting open-collector gate G10 is also set at L level. Then, one input signal to the AND gate G5 received through the inverter G6 goes to H level. Since the other input to the AND gate G5 is connected to the output terminal Q3 of the counter CNT1, the AND gate G5 produces a BUSY signal of H level representing that the motor is being driven. The BUSY signal is supplied to the input port PB7 of the CPU.

When the output terminal Q3 of the counter CNT2 goes to H level, the latch circuit LT1 latches the data from the output terminal Q3 of the shift register SH2. Since the output Q3 from the counter CNT2 is also supplied to the terminal LOAD of the counter DEC1, the counter DEC1 is set in the load mode and sets the data received from the output terminals Q0 to Q2 of the shift register SH2.

Since the data produced from the output ports PA0 to PA3 of the CPU in the dummy communication data set step is at L level, the data transferred to the shift register SH2 by the above-mentioned data transfer is all L level. Therefore, data of L level is also loaded in the counter DEC1. When the count is equal to or less than 0, the counter produces a signal of H level from the terminal DT≦0. Then, the output from the inverter G8 goes to L level, and the gate G9 also produces a signal of L level. The switch SWm is kept OFF, and the motor driver MD is kept deactivated. The one-shot multivibrator ON2 is triggered in response to the signal of H level from the terminal DT≦0 of the counter DEC1 and thereupon generates a negative pulse. The negative pulse from the one-shot multivibrator ON2 is supplied to a terminal $\overline{CLR}$ of the counter CNT2 and the counter CNT2 is then reset. When the counter CNT2 is reset, a signal of L level is produced from the output terminal Q3, the contact CLOCK is set at H level, and the signal of L level is supplied to the AND gate G5 through the inverter G6. The AND gate G5 produces a signal of L level to disable the BUSY signal.

In this manner, in the communication routine after the dummy communication data set step, the data at the input ports PB0 to PB5 is fetched in the CPU. Thereafter, the flow advances to the return step, the communication routine ends, and the flow then advances to the next step of turn off indication of direction. In this step, a prohibition signal for prohibiting the operation of a display DISP is produced from a port PC of the CPU to disable the display DISP.

Thereafter, the flow advances to the BUSY step. In this step, it is checked if the input to the input port PB7 of the CPU is at H level. As long as the input at the input port PB7 is at H level, the flow keeps returning to the BUSY step. When the input at the port PB7 goes to L level, the flow advances to the next step.

At this time, the BUSY signal is at L level, and the flow immediately advances to the accumulation clear step. In this step, a signal of H level is received from the port NO of the CPU to open the integration clear gate of the photosensor CCDP, to clear the accumulation charges on the sensors CR and CF, to turn on the transistor TR and to clear the charge on the capacitor C1. Thereafter, the flow advances to the start charge accumulation step. In this step, the signal from the port NO of the CPU is set at L level so as to start accumulating charges on the sensors CR and CF and to turn off the transistor TR. Then, the respective sensors CR and CF accumulate image signals in accordance with the image state, and the capacitor C1 is charged by the output from the sensor AC which measures the average amount of light incident on the respective sensors.

During this step of accumulating the image signals on the sensors, when the charge level on the capacitor C1 exceeds the reference level VCP, the comparator CP1 produces a signal of H level, in response to which the one-shot multivibrator ON1 is turned on.

A pulse from the one-shot multivibrator ON1 is supplied to the port CO of the CPU. When the CPU senses this pulse, it advances to the next store data step. The pulse from the one-shot multivibrator ON1 is supplied to the photosensor CCDP as a transfer pulse. In response to this pulse, the photosensor CCDP transfers the photocharges on the sensors CR and CF to the analog shift registers of the sensors and time-serially produces the charges on the sensors CR and CF in response to the pulses $\phi 1$ and $\phi 2$.

When the flow advances to the store data step in the manner as described above, the CPU sequentially stores the input data received at the data ports D0 to D3 in the internal memory. As has been described above, the photosensor sequentially produces the photocharges which are accumulated on the respective sensing portions $A_0$ to $A_3$ and $B_{10}$ to $B_{-7}$. These photocharges are supplied to the A/D converter AD. Therefore, in the store data step, the digital signals from the A/D converter AD which correspond to the photosignals from the sensing portions are time-serially supplied to the data ports D0 to D3 and are sequentially stored in the internal memory.

After the data store step is completed in this manner, the flow advances to the direction detection operation step. In this step, the individual data (digital signals corresponding to the photocharges) of the sensing portions $B_{-7}$ to $A_3$ of the photosensor CCDP which are stored in the internal memory are used to perform an automatic focusing direction detection operation.

This operation is performed in accordance with the detection system described with reference to FIG. 1 and the following term is calculated.

$$\sum_{n=0}^{2} \{|A_{n+1} - B_n| - |A_n - B_{n+1}|\} \quad (1)$$

where the digital signals of the charges of the sensing portions $A_3$ to $B_{-7}$ are represented by $A_3$ to $B_{-7}$ The sign (positive or negative) of the value of the term (1) given above indicates the direction (near- or far-focus) from the in-focus position. Thus, the direction to the in-focus position is calculated. Since this operation itself is not directly related to the present invention, it will not be described.

Thereafter, the flow advances to step FEXT.

In this step, the data supplied to the input port PB4 of the CPU in the communication routine described above is detected so as to determine if the lens mounted on the camera is an automatic focusing lens having a distance measuring function.

Figure 6A:
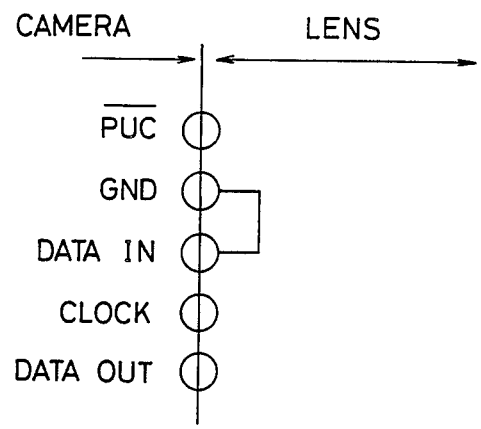
FIGS. 6A and 6B show circuit diagrams of connecting terminal portions in the case wherein a lens which has not been specifically designed for the camera shown in FIG. 3 is mounted thereon.

In the automatic focusing camera used in the present invention, as shown in FIG. 6A, contacts corresponding to the contacts $\overline{PUC}$, CLOCK and DATAOUT of the camera are open, and contacts corresponding to the contacts GND and DATAIN are closed. When the automatic focusing lens is mounted on the camera, the data transferred to the shift register SH1 in the communication routine is all at L level. Thus, a signal of H level is produced from the gate G1 and is supplied to the input port PB4.

The signal of H level supplied to the port PB4 of the CPU in the communication routine is detected in the step FEXT. Assume that a lens having an automatic focusing function is mounted on the camera. Then, the signal of H level is detected, and the flow advances to the clear accumulation charge step. Thereafter, the flow sequence from the clear accumulation step to the step FEXT is repeated. Therefore, in the case of a lens having an automatic focusing function, distance measurement add automatic focusing are performed at the lens side, and automatic focusing and direction indication are not performed at the camera side.

In the case of lenses other than one having an automatic focusing function, since a signal of H level is not detected in the step FEXT, the flow advances to the direction indication step from the step FEXT.

In the direction indication step, the signal representing the direction toward the in-focus position which is calculated in the direction detection operation step is supplied to the display DISP, thus indicating the focusing direction to the operator.

In this manner, when a lens mounted on the camera is not a lens having an automatic focusing function, the focusing direction is indicated by the display DISP, and the flow then advances to the step FMAN.

Figure 6B:
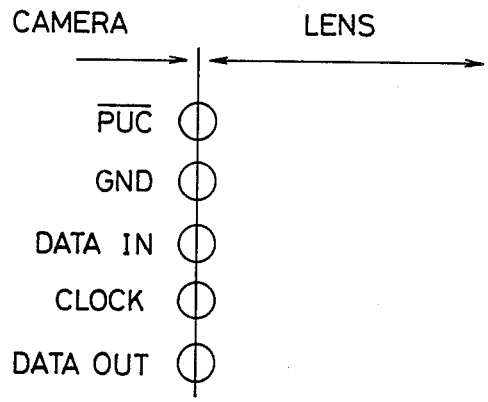

In the step FMAN, it is detected if the lens mounted on the camera is a normal lens. More specifically, it is detected if the data supplied to the input port PB5 of the CPU in the communication routine is at H level. Since a normal lens does not have contacts which are connected to the respective contacts of the camera, as shown in FIG. 6B, all the contacts are open. Therefore, data supplied to the shift register SH1 in the communication routine is all at H level, and data of H level is supplied to the input port PB5 of the CPU from the gate G2 in the communication routine. Therefore, when data of H level is detected in the step FMAN, it is determined that a normal lens is mounted on the camera. In this case, the flow returns to the clear accumulation charge step. Thereafter, the flow sequence from the clear accumulation charge step to the step FMAN is repeated to continuously perform operation (calculation) and indication of the focusing direction. For this reason, the operator can manually focus the lens by moving the focusing ring in the direction indicated by the display DISP.

When a lens mounted on the camera is a specific lens (as shown in FIG. 3) which can perform automatic focusing in response to a signal from the camera, the zoom plate ZP is connected to the terminals D0 and D1 of the data selector DS2, data of H level is not detected in the step FMAN, and the flow advances to the next predict operation step.

In the predict operation step, the digital signals respectively corresponding to the photocharges on the sensing portions $A_3$ to $B_{-7}$ and stored in the internal memory of the CPU in the data store step are used to calculate the following term:

$$\sum_{n=0}^{3} |A_N - B_{N+i}| \quad (i = -7 \text{ to } 7) \quad (2)$$

so as to calculate the amount of shift required to attain the in-focus position. This amount corresponds to the value of i which provides a minimum value of the term given by (2). Thus, the shift amount is calculated. However, since the method of calculating the shift amount itself is known and is not directly related to the present invention, this method will not be described. Thereafter, the flow advances to the ZOOM compensation step.

In the ZOOM compensation step, the shift amount which is calculated in the predict operation step is compensated in accordance with the zoom position of the lens, so that correct focusing can be continuously performed, irrespective of the zoom state.

In a zoom lens of front-element focusing type, sensitivity is different in accordance with the zoom position. Therefore, even if the lens is driven by the same amount (distance), the shift amount of the image surface cannot be set to be the same. Since the shift amount calculated in the predict operation step is an image surface shift amount, the zoom position must also be taken into account when the lens drive amount is calculated in accordance with this image surface shift amount.

For this reason, in the ZOOM compensation step, the shift amount calculated in the predict operation step is calculated, i.e., the image surface shift amount is compensated for in accordance with the data supplied to the input ports PB0 to PB3 of the CPU in the communication routine.

In the communication routine, the data supplied to the input terminals D0 to D3 of the data selector DS2 is supplied to the input ports PB0 to PB3 of the CPU. The zoom plate ZP has terminals ZM1 to ZM3, one of which is connected to the input terminals D0 and D1 of the data selector DS2 in accordance with the zoom ratio of the lens. As a result, in the communication routine, one of zoom data (0, 1), (0, 0), and (1, 0) is supplied to the input terminals PB0 and PB1 of the CPU.

In the ZOOM compensation step, if the zoom data is (0, 1) a divisor 1 is selected. When the zoom data is (0, 0), a divisor 1.5 is selected. When the zoom data is (1, 0), a divisor 2 is selected. Then, the shift amount calculated in the predict operation step is divided by the selected divisor so as to calculate the actual (compensated) lens drive amount from the image surface shift amount. Thereafter, the flow advances to the set predict communication data step.

In the set predict communication data step, a signal representing the lens drive amount calculated in the ZOOM compensation step is produced from the output ports PA0 to PA2 of the CPU, and a signal representing the drive direction of the lens toward the in-focus position is produced from the output port PA3 of the CPU.

The flow then advances to the communication routine call step so as to call the communication routine again.

In the called communication routine, the data produced from the output ports PA0 to PA3 of the CPU are transferred to the latch circuit LT1 and the counter DEC1 through the shift register SH2, and at the same time, the zoom data of the zoom plate ZP is supplied to the input ports PB0 to PB3 of the CPU.

When this data transfer is completed, a signal of H level is produced from the gate G5 a a BUSY signal.

The data produced from the output ports PA0 to PA2 represent the lens drive amount. Therefore, when a signal representing the lens drive amount is supplied to the counter DEC1, a signal of L level is produced from its DT≦0 terminal. A signal of H level is supplied to one input terminal of the gate G9 through the inverter G8. The other input terminal of the gate G9 is connected to the output terminal Q3 of the counter CNT2. Since a signal of H level is produced from the output terminal Q3 of the counter CNT2 during data transfer as described above, a signal of H level is produced from the gate G9 upon completion of the data transfer so as to turn on the switch SWm and to deactivate the motor driver MD.

Upon the data transfer, data from the output port PA3 of the CPU appears at the output terminal Q3 of the shift register SH2. Since this data represents the lens drive direction as described above, the signal representing the lens drive direction is latched in the latch circuit LT1 when the data transfer is completed. This lens drive direction signal is supplied to the motor driver MD through the amplifier OP1. Thus, the motor drives the lens in the direction indicated by the signal.

Upon the drive operation of the lens, the slider BR is slid on the contact plate FP so that a number of pulses corresponding to the lens drive amount are supplied to the counter DEC1. The counter DEC1 counts down the pulses from the lens drive amount signal. When the count of the counter DEC1 becomes zero, the counter produces a signal of H level from the DT≦0 terminal. Then, a signal of L level is produced from the gate G9, the m otor driver MD is deactivated, and the one-shot multivibrator ON2 is triggered. The counter CNT2 is reset, and a signal of H level is produced from the contact CLOCK The gate G5 produces a signal of L level to disable the BUSY signal.

The communication routine is executed in this manner, and transfer of the lens drive amount signal is performed in synchronism with the transfer clock pulses supplied to the lens through the contact CLOCK. The lens is driven in accordance with the transferred data. After the lens is moved to the in-focus position, the flow advances to the clear accumulation charge step. Thereafter, the flow sequence from the clear accumulation charge step to the communication routine step is repeated, thereby performing automatic focusing, in accordance with the movement of an object to be photographed.

According to the present invention, a BUSY signal is supplied to the camera during lens drive so as to prohibit the distance measuring operation by the photosensor. The lens drive operated in accordance with charge data on the photosensor during lens drive is prohibited, and the CLOCK contact also serves as a contact for producing the BUSY signal. Therefore, the number of contacts between the camera and the lens can be reduced to a minimum.

In the present invention, the mode of the camera is automatically set in accordance with a type of lens mounted thereon, so that the camera performs an operation optimal for each type of lens.

In the embodiment described above, when it is determined that a lens mounted on a camera has an automatic focusing function in accordance with the lens type data read through the above-mentioned terminal, direction indication is not performed at the camera side. Therefore, even if the distance measuring operation time at the camera side is different from that at the lens side, that at the lens side has priority and direction indication and focusing control can be performed. When a normal lens is mounted on the camera, direction indication alone is performed, and therefore the predict operation and the like are not performed. Therefore, the time required for the distance measuring operation is shortened.

Description of the type of lens mounted on the camera following the read operation of the lens type data is performed by hardware comprising an AND gate and a NOR gate. However, the read data can be supplied to the input ports PB0 to PB3 of the CPU, and the operation can be performed by a program (software).

Figure 4B:
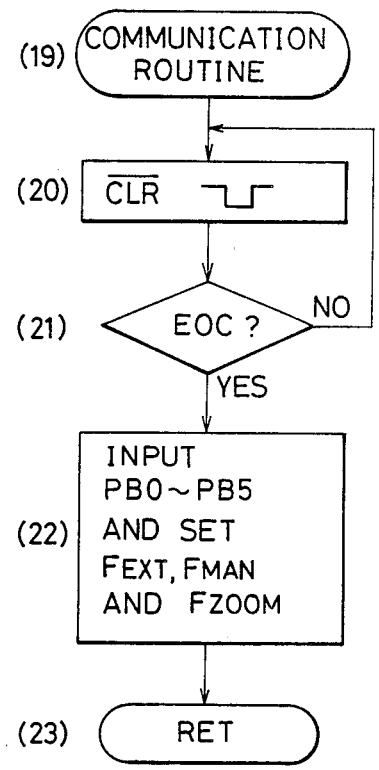

In the above embodiment, with reference to FIG. 4, when the lens mounted on the camera is determined to be a lens having an automatic focusing function, the flow returns to the clear accumulation charge step 7. However, the control sequence indicated by the dotted line may be adopted.

What is claimed is:

1. A photographic apparatus having a camera body with a focusing detection circuit for forming a signal for focusing a lens, and a lens unit with a lens drive circuit for driving said lens in accordance with the signal from said focusing detection circuit, comprising:
   (a) a terminal section for transferring the signal from said focusing detection circuit to said lens unit;
   (b) a receiving circuit for receiving the signal supplied from said focusing detection circuit through said terminal section and for driving said lens drive circuit in accordance with the signal received by said receiving circuit;
   (c) an operating signal forming circuit for producing an operating signal when said lens is being driven by said drive circuit, the operating signal from said operating signal forming circuit being terminated when the driving of said lens drive circuit has been completed and being transmitted to said camera body through said terminal section; and
   (d) a control circuit for substantially prohibiting operation of said focusing detection circuit, said control circuit inhibiting the operation of said focusing detection circuit during the time in which an operating signal is transmitted through said terminal section, and releasing the inhibition of the operation of said focusing detection circuit in response to the termination of the operation signal.

2. A system according to claim 1, wherein said operating signal forming circuit produces the operating signal after said receiving circuit receives the signal.

3. A system according to claim 1, wherein said signal forming circuit produces the signal when transfer of the data to said lens unit is completed.

4. A photographic apparatus having a camera body with a focusing detection circuit for forming a digital signal for focusing a lens, and a lens unit with a lens drive circuit for driving said lens in accordance with the signal from said focusing detection circuit, comprising:
   (a) a data terminal for transmitting the digital signal to said lens unit;
   (b) a clock terminal for transmitting a clock pulse for serially transferring the digital signal through said data terminal;
   (c) a receiving circuit arranged in said lens unit and connected to said data terminal for receiving the digital signal serially transferred in synchronism with the clock pulse supplied through said clock terminal, said lens drive circuit driving said lens in accordance with the digital signal received by said receiving circuit;

(d) an operating signal forming circuit for producing an operating signal when said lens is being driven by said lens drive circuit, the operating signal from said operating signal forming circuit being transmitted to said camera body through said clock terminal; and (e) a control circuit for substantially prohibiting operation of said focusing detection circuit in response to the operating signal supplied through said clock terminal.

5. A system according to claim 2, wherein said operating signal forming circuit produces the operating signal after said receiving circuit receives the digital signal.

6. A camera system having a camera with a focusing detection circuit, and a lens unit with a drive circuit for driving said lens in accordance with data supplied from said focusing detection circuit, said system alternately performing a focus detection operation and a lens drive operation, and said system comprising:

(a) a terminal section having a plurality of terminals for transferring a signal from said camera to said lens unit and including a data terminal for transferring the data to said lens unit;

(b) a signal forming circuit arranged in said lens unit for producing a signal during the lens drive operation, said signal forming circuit transferring the signal to said camera during the lens drive operation through a predetermined terminal of said terminal section, said signal forming circuit causing the signal to terminate in response to the completion of the lens drive; and (c) a prohibition circuit arranged in said camera for inhibiting the focus detecting operation in response to the signal supplied to said camera through said terminal section, said prohibition circuit releasing the inhibition of the focus detecting operation in response to the termination of the signal.

7. A system according to claim 6, wherein said signal forming circuit produces the signal when transfer of the data to said lens unit is completed.

8. A lens unit mountable on a camera which has a focusing detection circuit for forming a signal for focusing a lens, a terminal section of a plurality from said including an external terminal for externally transmitting the signal from said focusing detection circuit, and a prohibition circuit for inhibiting operation of said focusing detection circuit in response to the prohibition signal, said lens unit comprising:

(a) a lens unit terminal section having a plurality of terminals respectively connected to said plurality of terminals of said terminal section of said camera and including a lens terminal which can be connected to said external terminal;

(b) a drive circuit for driving said lens in accordance with the signal from said focusing detection circuit, which is supplied through said lens unit terminal section; and (c) a signal forming circuit for forming a drive signal when said lens is being driven by said drive circuit, said signal forming circuit being connected to a predetermined terminal of said lens unit terminal section and transmitting the drive signal to said prohibition circuit as the prohibition signal during a lens drive operation through said lens unit terminal section and said terminal section of said camera, said signal forming circuit causing the prohibition signal to terminate in response to the completion of the lens drive.

9. A unit according to claim 8, wherein said signal forming circuit produces the drive signal after transfer of the signal from said focusing detection circuit to said lens unit is completed.

10. A lens unit mountable on a camera which has a distance measuring circuit, a terminal section having a plurality of terminals for externally transmitting a signal such as data from said camera and including a data terminal for transmitting the data from said distance measuring circuit, and a prohibition circuit for inhibiting a distance measuring operation of said distance measuring circuit in response to an inhibition signal, said lens unit comprising:

(a) a lens unit terminal section having a plurality of terminals which include a data input terminal which can be connected to said data terminal and which can be respectively connected to said plurality of terminals of said terminal section of said camera;

(b) a drive circuit for driving said lens in accordance with data supplied through said data input terminal; and (c) a signal forming circuit for forming inhibition signal when said lens is being driven by said drive circuit, said signal forming circuit being connected to a predetermined terminal of said lens unit terminal section and transmitting the inhibition signal to said prohibition circuit of said camera through said lens unit terminal section and said terminal section of said camera, and said signal forming circuit causing the inhibition signal to terminate in response to the completion of the lens drive.

11. A unit according to claim 10, wherein said signal forming circuit produces the prohibition signal when transfer of the data to said lens unit is completed.

12. A camera for use with a lens unit having a lens unit terminal section in which a plurality of input terminals are arranged therein for receiving a signal and including a data input terminal for receiving data for driving a lens from said camera, a lens drive circuit for driving said lens in accordance with the data supplied through said data input terminal, and a signal forming circuit for forming a drive signal when said lens is being driven by said lens drive circuit and for transmitting the drive signal to a predetermined terminal of said lens unit terminal section, said camera comprising:

(a) a focusing detecting circuit for forming a signal for focusing said lens as data for driving said lens;

(b) a camera terminal section having a plurality of terminals for externally transmitting a signal and including a data terminal which can be connected to said lens data input terminal and transmits the data from said focusing detection circuit, said plurality of terminals of said camera terminal section being connectable to said plurality of terminals of said lens unit terminal section; and (c) a prohibition circuit for inhibiting operation of said focusing detection circuit in response to the drive signal supplied through said terminals of said lens unit and camera terminal sections, said prohibition circuit releasing the inhibition operation in response to the termination of the drive signal.

13. A photographic apparatus having a camera and a lens unit, said camera having a focusing detection circuit for forming a digital signal for focusing a lens, a data terminal for transmitting the digital signal, and a clock terminal for transmitting a clock pulse for serially transmitting the digital signal, and said lens unit having a lens unit data terminal connected to said data terminal of said camera, a lens unit clock terminal connected to said clock terminal, a receiving circuit connected to said lens unit data terminal and said lens unit clock terminal for receiving the serially transmitted digital signal in response to a clock pulse received through said lens unit clock terminal, and a drive circuit for driving said lens in accordance with the digital signal received by said receiving circuit, said apparatus comprising:
 (a) a signal forming circuit for producing a drive signal when said lens is being driven by said drive circuit, said signal forming circuit being connected to said lens unit clock terminal and transmitting the drive signal to said clock terminal of said camera through said lens unit clock terminal during a lens drive operation; and
 (b) a prohibition circuit arranged in said camera for prohibiting operation of said focusing detection circuit in response to the drive signal supplied to said camera through said clock terminal of said camera.

14. A camera which allows mounting of a first lens unit, and a second lens unit different from said first lens unit, said camera comprising:
 (a) a discrimination circuit for discriminating a type of lens mounted on said camera; and
 (b) an operating control circuit which is operated in a first control mode wherein a focusing operation is performed in accordance with an output from said discrimination circuit which indicates that the lens mounted on said camera is the first lens unit, and which is operated in a second control mode different from the first control when the output from said discrimination circuit indicates that the lens mounted on said camera is the second lens unit;
wherein said first lens unit has a drive circuit for driving said lens in accordance with an input signal; said second lens unit has a focusing detection circuit for forming a signal for focusing said lines and a lens drive circuit for driving said lens in accordance with an output from said focusing detection circuit; and said operation control circuit performs in the first control mode, a calculation for focusing said lens and transmission of a signal corresponding to the calculation result to the lens unit mounted on said camera, and, in the second control mode, inhibits transmission of the signal transmitted in the first control mode.

15. A camera which allows mounting of a first lens unit, and a second lens unit different from said first lens unit, said camera comprising:
 (a) a discrimination circuit for discriminating a type of lens mounted on said camera; and
 (b) an operation control circuit which is operated in a first control mode wherein a focusing operation is performed in accordance with an output from said discrimination circuit which indicates that the lens mounted on said camera is the first lens unit, and which is operated in a second control mode different from the first control when the output from said discrimination circuit indicates that the lens mounted on said camera is the second lens unit;
wherein said first lens unit has a drive circuit for driving said lens in accordance with an input signal; said second lens unit manually sets a distance; and said operation control circuit performs in the first control mode, a calculation for focusing said lens and transmission of a signal representing the calculation result to the lens unit mounted on said camera, and, in the second control mode, inhibits the transmission of the signal transmitted as in the first control mode.

16. A photographic apparatus having a first lens unit, another lens unit different from said first lens unit, and a camera, said first lens unit having a focal length data source, a data terminal for transmitting data from said focal length data source to said camera and a drive circuit for driving a lens in accordance with a drive amount signal of said lens, said camera allowing selective mounting thereon of said first lens unit and said another lens unit and having a camera terminal connectable to said data terminal upon mounting of said first lens unit on said camera, said apparatus comprising:
 (a) an operation circuit arranged in said camera for performing an operation of the drive amount signal of said lens in accordance with the data from said data source applied through said data terminal and an output from a focusing detection circuit and for transmitting the drive amount signal of said lens to a lens unit mounted on said camera;
 (b) a discrimination circuit for detecting an input signal received through said data terminal so as to discriminate if the signal is a signal based on the data from said data source; and
 (c) a control circuit for causing said operation circuit to perform the series of operations in accordance with a discrimination result of said discrimination circuit.

17. A lens unit mountable on a camera having a focusing detection circuit, an input terminal, a discrimination circuit for discriminating if data input through said input terminal is focal length data, an operation circuit for operating a signal for focusing a lens based on the focal length data and an output from said focusing detection circuit when the input data is discriminated to be the focal length data by said discrimination circuit, and an output terminal for externally transmitting an operation result, said lens unit comprising:
 (a) a data source for transmitting the focal length data;
 (b) a data terminal connected to said data source and connectable to said input terminal of said camera;
 (c) a second data terminal connectable to said output terminal and
 (d) a drive circuit, connected to said second data terminal, for driving said lens in accordance with an operation result received through said output terminal and said second data terminal.

18. A camera system including a camera, and a lens apparatus, comprising:
 (a) a first signal forming circuit for forming a digital signal according to the focusing state of said lens apparatus; receiving
 (b) a receiving circuit for serially receiving said digital signal formed by said first signal forming circuit; k
 (c) a connection line for transmitting a clock signal for causing said receiving circuit to serially receive said digital signal;

(d) a driving circuit for driving a lens on the basis of the signal received in said receiving circuit; and (e) a second signal forming circuit for forming an inhibition signal after the receipt of the signal in said receiving circuit and during lens driving by said driving circuit, said inhibition signal form said second signal forming circuit being transmitted to said first signal forming circuit through said connection line to inhibit the operation of said first signal forming circuit during the driving of the lens and the input of a digital signal formed after the driving of the lens to said receiving circuit.

19. A camera system having a camera body with a signal forming circuit for forming a digital signal used for moving a lens to an in-focus position thereof according to the focusing state thereof, a lens apparatus with a lens driving circuit for driving said lens on the basis of the digital signal formed by said signal forming circuit, and means for producing an information signal, said camera system comprising terminal means for connecting said lens apparatus with said camera body, said terminal means comprising:

a data terminal section for serially transmitting the digital signal from said signal forming circuit to said lens apparatus and serially transmitting the information signal of the information signal producing means to said camera body, said data terminal section comprising:

a first terminal for transmitting the digital signal to said lens apparatus; and a second terminal for transmitting the information signal to said camera body; and a clock terminal section to which a clock pulse is applied, the clock pulse being used for synchronizing transfer of a signal in the data terminal section, and wherein said signal forming circuit transfer the digital signal to said first terminal in synchronism with the clock pulse and, at the same time, said information signal producing means transfers the information signal to said second terminal in synchronism with the clock pulse inputted through said clock terminal section.

20. A camera system according to claim 19, wherein said information signal producing means forms a zoom information signal with respect to a lens.

21. A camera system including a camera with signal formation means for forming a signal representing drive quantity for driving a movable member of a lens apparatus on the basis of an information signal, and a lens apparatus with a driving circuit for driving the movable member on the basis of the signal from said signal formation means, and information means for forming the information signal relating to the lens apparatus, said system comprising:

(a) signal transmission terminal means for transmitting a signal from said signal formation means to the lens apparatus and transmitting a signal of said information means to said camera; and (b) synchronizing means for transmitting the signal from said information means to said camera in synchronism with transmission of the signal from said signal formation means to the lens apparatus; and (c) a control circuit for transmitting a dummy signal to the lens apparatus under the operation of said synchronizing means before the transmission of the signal representing the drive quantity from said signal formation means to the lens apparatus.

22. A camera system according to claim 21, wherein the dummy signal is a signal representing that the drive quantity is zero.

23. A camera system according to claim 21, wherein said signal formation means forms a signal representing drive quantity for moving a lens to an in-focus position thereof and the movable member moves the lens by said driving circuit.

24. A camera system including a camera with signal formation means for forming a signal representing drive quantity for a driving movable member of a lens apparatus on the basis of an information signal, and a lens apparatus with a driving circuit for driving the movable member on the basis of the signal from said signal formation means, and information means for forming the information signal relating to the lens apparatus, said system comprising:

(a) signal transmission terminal means for transmitting a signal from said signal formation means to the lens apparatus and transmitting a signal of said information means to said camera; and (b) a control circuit for transmitting the signal representing the drive quantity from said signal formation means to the lens apparatus after the transmission of the signal of said information means to the camera.

25. A camera system according to claim 24, wherein said control circuit executes the transmission of the signal of said information means to the camera at the same time that the signal representing the drive quantity from said signal formation means is transmitted to the lens apparatus.

26. A camera system according to claim 24, wherein said signal formation means forms a signal representing the drive quantity for moving a lens to an in-focus position thereof and the movable member moves the lens by said driving circuit.

27. A lens apparatus mountable on a camera which has a signal forming circuit for forming a digital signal used for moving a lens to an in-focus position, and a terminal means having a first data terminal for serially transmitting the digital signal to said lens apparatus and second data terminal for inputting an information signal from said lens apparatus to the camera and a clock terminal to which a clock pulse is applied, the clock pulse being used for synchronizing transfer of signals in the first and second terminals, said lens apparatus comprising:

a lens driving circuit for driving said lens on the basis of the digital signal formed by said signal forming circuit;

means for producing said information signal in digital form; and lens terminal means comprising:

a first lens data terminal connectable to said first data terminal of the camera;

a second lens terminal connectable to said second data terminal of camera; and a lens clock terminal connectable to said clock terminal of the camera, wherein said first lens data terminal is adapted for transmitting the digital signal to said lens apparatus through said first data terminal of the camera and said second lens data terminal is adapted for transmitting the information signal in digital form to the camera through said second data terminal of the camera, and wherein said signal forming circuit transfers the digital signal to said first data terminal and said first lens data terminal in synchronism with the clock pulse, and at the same time, said information signal producing means transfers the information signal to said second data terminal and said second lens data terminal serially in synchronism with the clock pulse inputted through said clock and lens clock terminal.

28. A photographic apparatus including a camera having a signal forming circuit for forming a digital signal to drive a movable member in an accessory apparatus, the accessory apparatus having a driving circuit for driving said movable member on the basis of the digital signal from said signal forming circuit, said photographic apparatus comprising:

data terminal means for transmitting the digital signal formed by said signal forming circuit to the accessory apparatus;

a clock terminal means for causing the transmission of the digital signal through said data terminal means to be movable an synchronism with a clock pulse; and a second signal forming circuit for forming a signal having a predetermined level during the driving of said movable member, the predetermined level signal formed by said second signal forming circuit being applied to said clock terminal means for transmitting the driving state of said movable member through said clock terminal means to the camera.

29. A photographic apparatus according to claim 28, wherein said second signal forming circuit forms said signal having the predetermined level after the transmission of said digital signal to said accessory apparatus.

30. A photographic apparatus according to claim 28, wherein said accessory apparatus comprises means for forming an information signal in digital form, and a second data terminal for transmitting said information signal to the camera in synchronism with the clock pulse applied to said clock terminal means.

31. A photographic apparatus according to claim 28 wherein the predetermined level of the predetermined level signal is low.

32. A photographic apparatus according to claim 29, wherein said signal having a predetermined level is applied to said second terminal after said digital signal is transmitted to the accessory apparatus.

33. An accessory apparatus mountable on a camera including a signal forming circuit for forming a digital signal for driving a movable member, a data terminal for serially outputting the digital signal forming by said signal forming circuit, and a clock terminal for causing the serial output of the digital signal through said data terminal to be in synchronism with a clock pulse, said accessory apparatus comprising:

a first terminal connectable to said data terminal, said movable member being driven by a driving circuit on the basis of the digital signal inputted through said first terminal from said signal forming circuit; and a second terminal connectable to said clock terminal, wherein said digital signal is transmitted in synchronism with the clock pulse by applying the clock pulse to said second terminal through said clock terminal, and wherein a signal having a predetermined level is applied to said second terminal during the driving of said movable member.

34. An accessory apparatus mountable on a camera including a signal forming circuit for forming a digital signal for driving a movable member, a first data terminal for serially outputting the digital signal formed by said signal forming circuit, a second data terminal for inputting an information signal into the camera, and a clock terminal for causing the serial output of the digital signal through said first data terminal or the serial input of the information signal through said second data terminal to be in synchronism with a clock pulse, said accessory apparatus comprising:

a third terminal connectable to said first terminal, the digital signal formed by said signal forming circuit being input through said third terminal, and said movable member being driven by a driving circuit on the basis of said digital signal;

a fourth terminal connectable to said second data terminal, said information signal being output through said fourth terminal; and a fifth terminal connectable to said clock terminal, said digital signal being transmitted between the camera and the accessory apparatus by applying a clock pulse to said fifth terminal through said clock terminal, and wherein a signal having a predetermined level is applied to said fifth terminal during the driving of said movable member.

35. An accessory apparatus mountable on a camera including a signal forming circuit for forming a digital signal for driving a movable member, a data terminal for serially outputting the digital signal formed by said signal forming circuit, and a clock terminal for causing the serial output of the digital signal through said data terminal to be in synchronism with a clock pulse, said accessory apparatus comprising:

a first terminal connectable to said data terminal;

a driving circuit for driving said movable member on the basis of the digital signal input through said first terminal;

a second terminal connectable to said clock terminal, said digital signal being transmitted by applying a clock pulse to said second terminal through said clock terminal; and a second signal forming circuit for forming a signal having a predetermined level during the driving of said movable member, the signal formed by said second signal forming circuit being applied to said second terminal.

36. An accessory apparatus according to claim 35, wherein said second signal forming circuit forms said signal having the predetermined level after the transmission of said digital data to said accessory apparatus.

37. An accessory apparatus according to claim 35, wherein the predetermined level of the predetermined level signal is low.

38. An accessory apparatus mountable on a camera including a signal forming circuit for forming a digital signal from driving a movable member in the accessory apparatus, a first data terminal for serially outputting the digital signal formed by said signal forming circuit, a second data terminal for inputting an information signal into the camera, and a clock terminal for causing the serial output of the digital signal through said first data terminal or the serial input of the information signal through said second data terminal to be in synchronism with a clock pulse, said accessory apparatus comprising:

a third terminal connectable to said first terminal, said digital signal from said signal forming circuit being inputted through said third terminal;

a driving circuit for driving said movable member on the basis of the digital signal inputted through said third terminal;

a fourth terminal connectable to said second data terminal;

an information circuit for forming the information signal in digital form;

a fifth terminal connectable to said clock terminal, the transmission of said digital signal between the camera and the accessory being performed by applying a clock pulse to said fifth terminal through said clock terminal; and a second signal forming circuit for forming a signal having a predetermined level during the driving of said movable member, said signal formed by said second signal forming circuit being applied to said fifth terminal.

39. An accessory apparatus according to claim 38, wherein said second signal forming circuit forms said signal having the predetermined level after transmission of said digital data to said accessory apparatus.

40. An accessory apparatus according to claim 38, wherein the predetermined level of the predetermined level signal is low.

* * * * *

UNITED STATES PATENT AND TRADEMARK OFFICE
CERTIFICATE OF CORRECTION

PATENT NO. : 4,790,649

DATED : December 13, 1988

INVENTOR(S) : Harada, et al.

It is certified that error appears in the above-identified patent and that said Letters Patent is hereby corrected as shown below:

COLUMN 2
    Line 63, change "if" to --is--.

COLUMN 6
    Line 34, change "EN" to --EN- --.

COLUMN 9
    Line 17, change "add" to --and--.

COLUMN 11
    Line 2, change "a a" to --as a--; and
    Line 34, change "m otor" to --motor--.

COLUMN 13
    Line 15, change "claim 2" to --claim 4--; and
    Line 48, change "from said" to --of terminals--.

COLUMN 15
    Line 45, change "lines" to --lens--.

COLUMN 16
    Line 9, delete "as";
    Line 62, delete "receiving"; and
    Line 65, delete "k".

COLUMN 17
    Line 6, change "form" to --from--; and
    Line 37, change "transfer" to --transfers--.

UNITED STATES PATENT AND TRADEMARK OFFICE
CERTIFICATE OF CORRECTION

PATENT NO. : 4,790,649

DATED : December 13, 1988

INVENTOR(S) : Harada, et al.

It is certified that error appears in the above-identified patent and that said Letters Patent is hereby corrected as shown below:

COLUMN 19
Line 24, change "movable an" to --in--; and
Line 54, change "forming" to --formed--.

COLUMN 20
Line 59, change "from" to --for--.

Signed and Sealed this

Twentieth Day of March, 1990

Attest:

JEFFREY M. SAMUELS

Attesting Officer

Acting Commissioner of Patents and Trademarks